United States Patent Office 3,305,774
Patented Feb. 21, 1967

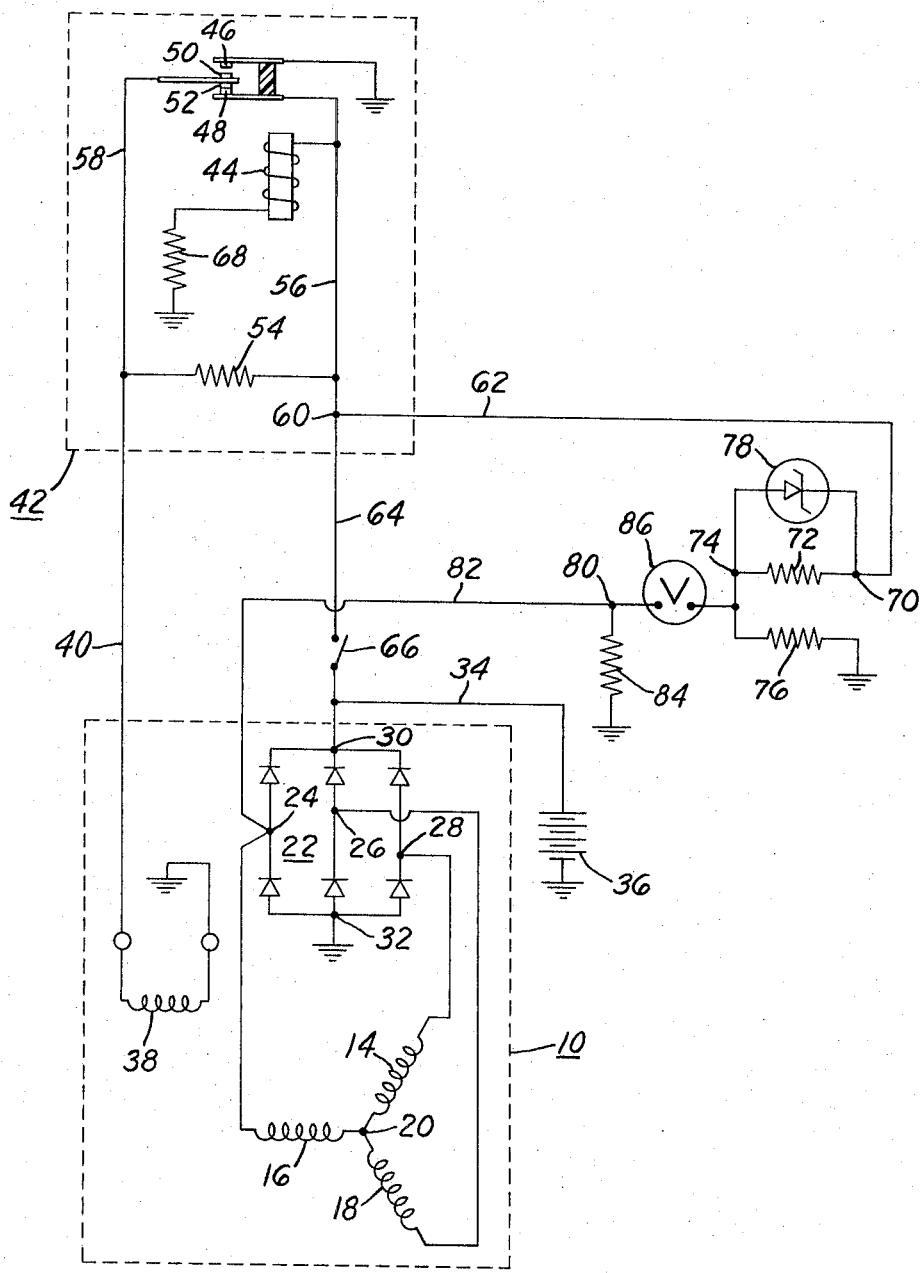

3,305,774
MALFUNCTION INDICATOR FOR DIODE-RECTIFIED ALTERNATOR CURRENT GENERATORS CAPABLE OF INDICATING HIGH VOLTAGE AND OPEN FIELD CONDITIONS
Thomas C. Heath, Anderson, Ind., assignor to General Motors Corporation, Detroit, Mich., a corporation of Delaware
Filed Aug. 12, 1964, Ser. No. 389,051
10 Claims. (Cl. 324—51)

This invention relates to a malfunction indicator for diode-rectified alternating current generators which in capable of indicating a malfunction in the generator or rectifying diodes of the power unit that supplies electrical power to a load. This application is related to application Serial No. 389,050, filed concurrently herewith and assigned to the assignee of this invention.

The present invention is concerned with indicating to an operator of a motor vehicle a defect or malfunction in a diode-rectified alternating current generator which supplies direct current to the loads on a motor vehicle such as the storage battery.

One of the objects of this invention is to provide a malfunction indicating system where the system includes means for comparing two voltages, one of which is related to system voltage and the other of which is produced at a point connected with one of the phase windings of the alternating current generator and wherein the system is capable of indicating an open field in the alternating current generator.

Another object of this invention is to provide a malfunction indicating system which compares two electrical potentials one of which is related to system voltage and the other of which is related to the potential of a point connected with at least one phase winding of the alternating current generator and wherein the system is capable of indicating an overvoltage malfunction.

In carrying the above-noted objects forward, the voltage that is related to system voltage can be provided by a voltage divider which is connected across the D.C. output terminals of a bridge rectifier network. The other voltage that is used as a comparative voltage can be provided by connecting a lead wire to one of the A.C. input terminals of the bridge rectifier network or can be provided by connecting a lead wire to the neutral of a three phase Y-connected output winding. The open field condition is indicated in this system by connecting a resistor to one side of an indicating device that is connected between the two reference potential points. The means for sensing the overvoltage condition includes a Zener diode which is connected across a part of the voltage divider.

Further objects and advantages of the present invention will be apparent from the following description, reference being had to the accompanying drawings wherein preferred embodiments of the present invention are clearly shown.

In the drawing:

The single figure drawing is a schematic circuit diagram of a power supply system that has the malfunction indicating system of this invention.

Referring now to the drawing, the reference numeral 10 generally designates a power unit which is a diode-rectified alternating current generator. The alternating current generator includes a three phase Y-connected output winding comprised of phase windings 14, 16 and 18. The phase windings are connected together at the neutral 20.

The output voltage of the three phase Y-connected winding is rectified by a three phase full-wave bridge rectifier network generally designated by reference numeral 22 and including six diodes that are preferably of the silicon type. The phase windings are connected to the A.C. input terminals 24, 26 and 28 of the bridge rectifier and this bridge rectifier has D.C. output terminals 30 and 32. The D.C. output terminal 32 is grounded whereas the D.C. output terminal 30 is connected with a power supply conductor 34 that feeds a battery 36 and other direct current loads on a motor vehicle.

The field winding of the alternating current generator is designated by reference numeral 38. One side of the field winding 38 is grounded as shown while the opposite side of this field winding is connected with a conductor 40.

The output voltage of the power unit 10 is controlled by a conventional vibrating contact voltage regulator generally designated by reference numeral 42. This regulator includes a relay coil 44, movable contacts 46 and 48, and fixed contacts 50 and 52. The contacts 46 and 48 are insulated from each other and move together and the arrangement is such that contacts 48 and 52 open and close during certain phases of operation of the regulator while during other phases of operation, the contacts 46 and 50 open and close. The regulator includes a resistor 54 connected between conductors 56 and 58.

The conductor 56 is connected with a junction 60 and this junction is connected with conductors 62 and 64. The conductor 64 can be connected to conductor 34 when switch 66 is closed. The switch 66 can be the contacts of a manually operable switch or can be the relay contacts of a field relay which is controlled by a manually operable switch.

It is seen that one side of the relay coil 44 is connected to ground through resistor 68. The fixed contacts 50 and 52 of the voltage regulator are connected with the conductor 58 and therefore are connected with conductor 40. The movable contact 46 is grounded while the movable contact 48 is connected with conductor 56.

Although the regulator 42 has been shown as a conventional vibrating contact regulator, it will be appreciated by those skilled in the art that the regulator could take other forms and could be of the transistor type.

The conductor 62 is connected with a junction 70. A resistor 72 is connected between junction 70 and a junction 74 which forms a reference potential point. Another resistor 76 is connected between junction 74 and ground. The resistors 72 and 76 have substantially equal resistance values. A Zener diode 78 is connected across the resistor 72.

The A.C. input terminal 24 of the bridge rectifier 22 is connected with a junction 80 by means of a conductor 82. The junction 80 forms a second reference potential point and it is seen that a resistor 84 is connected between junction 80 and ground.

A voltmeter 86 is connected between the reference potential points 74 and 80. The voltmeter is of a type that holds the pointer in a vertical position when the reference potential points 74 and 80 are at equal potentials. When the potential of the reference potential points 74 and 80 are not equal, the pointer of the voltmeter 86 will deflect in one direction or the other from its vertical position.

In the operation of this system, the direct current output of the bridge rectifier 22 appears between conductor 34 and ground and this potential will remain substantially constant due to the provision of the voltage regulator 42 which is capable of varying the field current for the field winding 38 in a manner well known to those skilled in the art. The voltage appearing between conductor 34 and ground is applied across the voltage divider 72 and 76 via closed switch 66, conductor 64, junction 60, conductor 62, and then through resistors 72 and 76 to ground.

It has been found that under normal operating conditions where there is no malfunction in either the alternating current generator or in the bridge rectifier of the power unit 10, the voltage at junction 24 will be substantially one-half system voltage. Since resistors 72 and 76 are of equal value, the reference potential point 74 will also be at one-half system voltage. It thus is seen that under normal operating conditions, the potential of the reference potential points 74 and 80 are substantially equal so that the pointer of the voltmeter 86 remains vertical indicating no malfunction in the system.

If a malfunction occurs in the power unit 10 so as to cause a difference in potential between reference potential points 74 and 80, the pointer of the voltmeter will deflect in one direction or the other indicating to the operator of the motor vehicle that there is some trouble in the power unit 10.

The resistor 84 is provided in the system in order that the indicating arrangement will be capable of indicating a condition where the field winding 38 is open. If the field winding 38 opens, the output voltage of the power unit 10 will be reduced substantially to zero or to some small voltage that might be provided by residual magnetism. This means that the potential of junction 24 will be reduced substantially to zero but the potential of battery 36 will be impressed between junction 70 and ground. Current will now be able to flow from the positive side of battery 36, through conductor 34, through closed switch 66, through conductors 64 and 62, and through resistor 70 to the reference potential point 74. At this point, the current will split with part of it flowing to ground through resistor 76 and the other part flowing to ground through the voltmeter 86, the junction 80 and resistor 84. This will cause a deflection of the pointer of the voltmeter 86 from its vertical position to therefore indicate to the operator of the vehicle that there is a malfunction in the generating system. The resistor 84 has no effect under normal conditions since under normal conditions, the potential of junction 80 will still be substantially equal to the potential of junction 74.

The Zener diode 78 is provided in order that the system will be capable of indicating a condition where the output voltage or system voltage appearing between conductor 34 and ground is higher by a predetermined amount than that to be provided by the voltage regulator. Thus in a twelve volt system, the voltage regulator 42 will normally maintain the voltage appearing between conductor 34 and ground substantially constant at a voltage of, for example 14 or 15 volts. If for some reason the voltage regulator can no longer maintain the voltage at the regulated level as where the voltage regulator is shorted to supply full field current continuously to the field winding 38, this condition will be indicated by a deflection of the voltmeter 86. Thus if the voltage rises to some abnormal value, the Zener diode 78 will break down in its reverse direction which will maintain the voltage across resistor 72 at a constant value which is equal to the breakdown voltage of the Zener diode. This value can be selected such that the potential of junction 74 will rise in regard to the potential of junction 80 during the abnormally high voltage condition causing the voltmeter to deflect to indicate a malfunction. The Zener diode 78 has no effect on the indicating system under normal operating conditions of the alternator-rectifier unit 10. Thus, the voltage breakdown rating of the Zener diode 78 can be selected such that with a normal output voltage from the bridge rectifier 22, the Zener diode 78 does not break down.

Although the indicator 86 has been shown as a voltmeter, it will be appreciated by those skilled in the art that it could take other forms. As an example, the voltmeter might be arranged such that deflection of the pointer causes electrical contacts to close which control a signal lamp. In another arrangement, the voltmeter 86 could be replaced by the actuating coil of a relay, the contacts of which control a signal light circuit. In addition, a device could be provided which moves a shutter rather than the pointer of a voltmeter, the shutter having red and green window sections positioned over a fixed light. The term "indicator" as used in the specification and claims is therefore intended to cover any device which is capable of indicating a difference in potential between the reference potential points 74 and 80 of the system.

It has been found that the malfunction indicator system of this invention will be operable if the lead 82 is connected to the neutral 20 rather than to A.C. input terminal 24.

While the embodiments of the present invention as herein disclosed, constitute a preferred form, it is to be understood that other forms might be adopted.

What is claimed is as follows:

1. A failure indicating system for a diode-rectified alternating current generator comprising, an alternating current generator having a three phase output winding, a three phase full-wave bridge rectifier having D.C. output terminals and having A.C. input terminals connected with said output winding, a battery, means connecting said battery across the D.C. output terminals of said bridge rectifier, a voltage divider network connected across the D.C. output terminals of said bridge rectifier ence potential point connected with at least one phase winding of said output winding, said reference potential points having substantially equal voltages when the output voltage of said generator is normal, an indicating device having a first reference potential point, a second reference vice connected between said first and second reference potential points, said indicating device being capable of indicating a difference in potential between said reference potential points, and a circuit element having resistance connected between said second reference potential point and one of said D.C. output terminals of said bridge rectifier network, said circuit element providing a path for current flowing through said indicating device when said generator has substantially no output voltage.

2. The failure indicating system of claim 1 where the second reference potential point is connected with one of the A.C. input terminals of the bridge rectifier network.

3. The indicating system according to claim 1 where the indicating means is a voltmeter.

4. An electrical failure indicating system for a diode-rectified alternating current generator comprising, an alternating current generator having a three phase output winding, a three phase full-wave bridge rectifier having A.C. input terminals connected with said output winding and having a pair of D.C. output terminals, a battery, means connecting said battery across the D.C. output terminals of said bridge rectifier, a voltage divider connected across the D.C. output terminals of said bridge rectifier and across said battery, said voltage divider including a first reference potential point, a second reference potential point connected with at least one of the phase windings of said output winding, said first and second reference potential points having substantially equal potentials when said alternator and bridge rectifier are operating normally, an indicator connected between said first and second reference potential points, said indicator being capable of indicating a condition where the potentials of said first and second reference potential points are equal or not equal, and a constant voltage device connected across at least a portion of said voltage divider.

5. The indicating system according to claim 4 where the second reference potential point is connected with one of the A.C. input terminals of said bridge rectifier network.

6. The indicating system according to claim 4 where the constant voltage device is a Zener diode.

7. A failure indicating system for a diode-rectified alternating current generator comprising, an alternating current generator having a three phase output winding, a three phase full-wave bridge rectifier having A.C. input terminals connected with said output winding and a pair of D.C. output terminals, a battery, means connecting said battery across the D.C. output terminals of said bridge rectifier, a voltage divider comprised of two resistors of equal resistance value connected across the D.C. ouput terminals of said bridge rectifier and across said battery, said resistors having a common junction forming a first reference potential point, a second reference potential point connected with at least one of the phase windings of said output winding, the potentials of said first and second reference potential points being substantially equal when said generator and bridge rectifier are operating normally, an indicator connected between said first and second reference potential points, said indicator indicating the relative potential of said reference potential points, and a Zener diode connected across one of said resistors of said voltage divider network.

8. The indicating system according to claim 7 where the alternating current generator has a field winding and wherein a voltage regulating means is provided for controlling current flow through said field winding from said bridge rectifier.

9. The indicating system according to claim 7 wherein a resistor is connected between the second reference potential point and one of said D.C. output terminals of said bridge rectifier.

10. The indicating system according to claim 7 wherein the second reference potential point is connected with one of the A.C. input terminals of said bridge rectifier.

References Cited by the Examiner

UNITED STATES PATENTS

| | | | |
|---|---|---|---|
| 2,817,830 | 12/1957 | Rover | 340—249 |
| 3,205,422 | 9/1965 | Gold | 320—48 X |
| 3,217,311 | 11/1965 | Custer et al. | 340—249 |
| 3,223,913 | 12/1965 | Kalns et al. | 320—48 X |
| 3,231,811 | 1/1966 | Peras | 322—99 |

WALTER L. CARLSON, *Primary Examiner.*

G. R. STRECKER, *Assistant Examiner.*

UNITED STATES PATENT OFFICE
CERTIFICATE OF CORRECTION

Patent No. 3,305,774                                    February 21, 1967

Thomas C. Heath

It is hereby certified that error appears in the above numbered patent requiring correction and that the said Letters Patent should read as corrected below.

Column 4, line 25, for "ence" read -- having a first reference potential point, a second reference --; lines 28, 29 and 30, for "de-having a first reference potential point, a second refer-vice" read -- device --.

Signed and sealed this 7th day of November 1967.

(SEAL)
Attest:

Edward M. Fletcher, Jr.                              EDWARD J. BRENNER

Attesting Officer                                         Commissioner of Patents